US011623593B2

(12) United States Patent
Akif et al.

(10) Patent No.: US 11,623,593 B2
(45) Date of Patent: Apr. 11, 2023

(54) DEFORMATION DEVICE FOR A MOTOR VEHICLE AND MOTOR VEHICLE COMPRISING A DEFORMATION DEVICE OF THIS TYPE

(71) Applicant: Bayerische Motoren Werke Aktiengesellschaft, Munich (DE)

(72) Inventors: Oeztzan Akif, Munich (DE); Gerhard Fichtinger, Grasbrunn (DE); Wilhelm Riedl, Pfaffenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 111 days.

(21) Appl. No.: 17/423,640

(22) PCT Filed: Mar. 16, 2020

(86) PCT No.: PCT/EP2020/057039
§ 371 (c)(1),
(2) Date: Jul. 16, 2021

(87) PCT Pub. No.: WO2020/187819
PCT Pub. Date: Sep. 24, 2020

(65) Prior Publication Data
US 2022/0144197 A1 May 12, 2022

(30) Foreign Application Priority Data
Mar. 18, 2019 (DE) ..................... 10 2019 106 780.4

(51) Int. Cl.
*B60R 19/26* (2006.01)
*B60R 19/28* (2006.01)
*B60R 19/30* (2006.01)

(52) U.S. Cl.
CPC .............. *B60R 19/26* (2013.01); *B60R 19/28* (2013.01); *B60R 19/30* (2013.01); *B60R 2019/268* (2013.01)

(58) Field of Classification Search
CPC ....... B60R 19/023; B60R 19/26; B60R 19/28; B60R 19/34
(Continued)

(56) References Cited

U.S. PATENT DOCUMENTS 8,246,091 B1    8/2012  Jayasuriya et al.
8,267,445 B1 *  9/2012  Jayasuriya .............. B60R 19/36
                                                          180/274
2018/0118155 A1  5/2018  Grehl et al.

FOREIGN PATENT DOCUMENTS

DE      102012107152 B3 *  9/2013  ............. B60R 19/34
DE      10 2015 211 979 A1   12/2016
(Continued)

OTHER PUBLICATIONS

International Search Report (PCT/ISA/210) issued in PCT Application No. PCT/EP2020/057039 dated Apr. 21, 2020 with English translation (five (5) pages).
(Continued)

Primary Examiner — Jason S Daniels
(74) Attorney, Agent, or Firm — Crowell & Moring LLP (57) ABSTRACT

A motor vehicle deformation device has two elements moveable together in a collision event and optionally locked. A locking device has a first centrifugal lever pivotably mounted about a first pivot axis located on the first element, a first torsion spring operatively connected to the first lever, a first rolling surface and a first contact surface arranged distally to same, as well as an identically designed second centrifugal lever neighboring the first lever. In a low-speed collision, the two levers each swivel such that the two rolling surfaces are in contact with one another and the
(Continued)

two contact surfaces each rest against a corresponding receiving surface on the second element. In a pedestrian accident situation, the two levers each swivel such that the two rolling surfaces are in contact with one another, while the first and second contact surfaces are at a distance from the second element.

10 Claims, 5 Drawing Sheets

(58) Field of Classification Search
USPC .......................................... 293/132, 133, 135
See application file for complete search history.

(56) References Cited

FOREIGN PATENT DOCUMENTS

| DE | 10 2016 211 135 A1 | 12/2017 | |
|----|---------------------|---------|---|
| EP | 1 386 794 A1 | 2/2004 | |
| FR | 2928318 A1 * | 9/2009 | ............. B60R 19/24 |

OTHER PUBLICATIONS

German-language Written Opinion (PCT/ISA/237) issued in PCT Application No. PCT/EP2020/057039 dated Apr. 21, 2020 (five (5) pages).
German-language Search Report issued in German Application No. 10 2019 106 780.4 dated Dec. 2, 2019 with partial English translation (14 pages).

* cited by examiner

DEFORMATION DEVICE FOR A MOTOR VEHICLE AND MOTOR VEHICLE COMPRISING A DEFORMATION DEVICE OF THIS TYPE

BACKGROUND AND SUMMARY OF THE INVENTION

The present invention relates to a deformation device for a motor vehicle. Furthermore, the present invention relates to a motor vehicle which is provided with such a deformation device.

For the purposes of protecting a motor vehicle in the event of a front-end accident, passengers of the motor vehicle involved in such an accident, and persons who are located outside the motor vehicle and are involved in such an accident, in particular pedestrians, a series of measures is provided.

DE 10 2016 211 135 A1 discloses a deformation device for a motor vehicle having a cross-member and a deformation element which is fitted to the cross-member, wherein the deformation element has a first element and a second element which can be displaced relative to each other as a result of a collision, and a locking means which is pretensioned or which can be pretensioned as a result of a collision and which is movably supported on one of the first element and the second element and can be locked with the other of the first element and second element in the course of a collision. As a result of a deformation device which is configured in such a manner, in principle a reliable and precise activation of the deformation device dependent on the load is enabled. A deformation device of just such a type is also known from EP 1 386 794 A1.

DE 10 2015 211 979 A1 discloses a deformation device for a motor vehicle having a cross-member and a deformation element which is fitted to the cross-member, wherein the deformation element has a first element and a second element which can be displaced relative to each other as a result of a collision and a locking means which can be pretensioned and which is movably supported on the first element and which can optionally be locked with the second element or not locked in the course of a collision. The locking means has a first centrifugal force lever which is pivotably supported about a first pivot axis which is located on the first element and a second centrifugal force lever which is adjacent to the first centrifugal force lever and which is supported about a second pivot axis which is located on the first element.

An object of the present invention is to provide an alternative to the devices known from the prior art.

This object is achieved with a deformation device according to the independent claims. Advantageous embodiments can be derived from the dependent claims.

The deformation device according to the invention is provided for a motor vehicle having a cross-member which is arranged at the front or rear end and has a deformation element which is fitted thereto. The deformation element comprises a first element and a second element, which can be displaced relative to each other as a result of a collision, and a locking device which is pretensioned or can be pretensioned as a result of a collision and which is movably supported on one of the first element and the second element and which can optionally be locked or not locked with the other of the first element and the second element in the course of a collision.

The locking device has a first centrifugal force lever which is pivotably supported about a first pivot axis located on the first element, a first torsion spring which is arranged around the first pivot axis and which is actively connected to the first centrifugal force lever, a first rolling face and a first abutment face which is distal thereto. Furthermore, there is provided a second centrifugal force lever which is adjacent to the first centrifugal force lever and which has a configuration which is similar to the first centrifugal force lever, that is to say, it is pivotably supported about a second pivot axis which is located on the first element and has a second torsion spring which is arranged around the second pivot axis and which is actively connected to the second centrifugal force lever, a second rolling face and a second abutment face which is distal thereto.

In the event of a low-speed crash, in which a comparatively high load of particularly up to approximately 100 kN acts at a comparatively low speed of 4 km/h up to approximately 20 km/h on the front region (or rear region) of a motor vehicle (a correspondingly prominent case is the parking bump known per se), the first centrifugal force lever and the second centrifugal force lever pivot in each case about the first pivot axis or second pivot axis in such a manner that the first rolling face and the second rolling face move into abutment with each other, the first abutment face is in abutment with a corresponding first receiving face which is located on the second element and the second abutment face is in abutment with a corresponding second receiving face which is located on the second element.

In the event of an accident situation which represents a pedestrian accident and in which a comparatively small load of up to approximately 5 kN in a comparatively high speed range of approximately from 20 km/h to 40 km/h acts on the deformation device according to the invention, however, the first centrifugal force lever and the second centrifugal force lever pivot in each case about the first pivot axis and the second pivot axis in such a manner that the first rolling face and the second rolling face are in abutment with each other, whilst the first abutment face and the second abutment face are remote from the second element.

The deformation device according to the invention advantageously requires only a comparatively small structural space. Furthermore, advantageously, compared with the prior art, a reduced switching path in the event of a low-speed crash or reduced switching forces in the event of an accident situation which represents a pedestrian accident is/are possible. Finally, the deformation device according to the invention is also stable and robust since the two centrifugal force levers, when assuming their respective position resulting from an accident, roll on each other in a manner of speaking and are consequently supported against each other.

According to a preferred embodiment, there is provision for the second element to have a portion which is inclined in the direction of the first element and via which the distal end of the first centrifugal force lever with respect to the first rolling face and via which the distal end of the second centrifugal force lever with respect to the second rolling face slides in the course of a collision in order to tension the first torsion spring or second torsion spring. In other words, a pretensioning of the respective torsion spring is carried out during an accident situation. It is thereby advantageously possible to completely dispense with a pretensioning of the respective torsion spring which generally reduces the service-life or—according to another preferred embodiment—to provide only a slight pretensioning of the respective torsion spring which is sized in such a manner that at most disruptive noise in the deformation device according to the invention, in particular rattling, is prevented.

The inclined portion disclosed above has, according to a preferred embodiment in a virtual plane defined by the first centrifugal force lever and the second centrifugal force lever and when viewed in the longitudinal direction of the deformation device, an inclination angle between 5° and 30°, preferably between 20° and 25°, in a particularly preferred manner of 23°. A particularly simple adaptation of the spring characteristics, in particular the spring constant, of the first torsion spring or second torsion spring and the inclination of the portion provided according to the invention is thereby advantageously enabled.

A further improved improvement of the stability and robustness of the deformation device according to the invention is advantageously provided when the first centrifugal force lever has a first locking face which, in the course of a collision, is in abutment with a corresponding first counter-face which is located on the first element, and when the second centrifugal force lever has a second locking face which, in the course of a collision, is in abutment with a corresponding second counter-face which is located on the first element.

According to another preferred embodiment, there is provision for the deformation device to have a restoring device which is constructed in a resilient manner and which is supported on the second element for returning the first element into the collision-free starting position thereof.

The resiliently constructed restoring device is constructed from an appropriate resilient material, preferably spring steel or plastics material. It is supported on the second element, whereby at the same time a series of advantages can be afforded with the deformation device according to the invention.

On the one hand, as a result of an integration of the restoring device in the deformation device, a modular deformation device which provides a restoring function can be produced, whereby per se a simplified production logistics in the production of a motor vehicle which is provided with one or more deformation device(s) according to the invention is produced.

On the other hand, the deformation device according to the invention results in a simplified and not least safer restoring function since the components which can be moved relative to each other are connected in a modular manner and, in contrast to the deformation devices known from the prior art, during the production process of a correspondingly equipped motor vehicle no particularly complex and potentially error-prone orientation of the first element with the restoring device is required.

It should be noted that the bearing of the restoring device on the second element in accordance with the mechanical energy acting on the deformation device according to the invention is either maintained or cancelled. The bearing of the restoring device is thus maintained in the event of a low-speed crash. However, a release of the bearing of the restoring device from the second element is provided in the event of a pedestrian collision. The release of the bearing of the restoring device may in this instance be carried out by means of a mechanical separation or detachment of the restoring device from the second element and/or an at least partial destruction of the restoring device. Advantageously, a load-dependent deformation of the deformation device according to the invention is consequently provided, by means of which deformation a low-speed crash function or pedestrian protection function can be carried out.

The above-mentioned object is also achieved with a motor vehicle having a cross-member and a bumper, wherein at least one deformation device of the above-mentioned type according to the invention is provided. The advantages mentioned above apply accordingly.

According to the invention, in the transverse vehicle direction a number of deformation devices according to the invention may be provided so that an entire series of loads or protection functions are produced. In this instance, the position thereof, for example, the arrangement thereof parallel with the transverse vehicle axis, with respect to a vehicle body can in principle be freely configured and is limited only by the loading forming the basis.

In a particularly advantageous manner, such deformation devices which are in particular secured along the cross-member have spring characteristics, in particular spring constants, which are at least partially different from each other. It is thereby possible for the respective deformation devices to be adapted in a simple manner to different loads in accordance with the position.

There follows with reference to FIGS. 1 to 3C a detailed, non-prejudicial, in particular limiting, description of embodiments of the present invention. Elements which are identical are given identical reference numerals, unless stated otherwise.

DETAILED DESCRIPTION OF THE DRAWINGS

Figure 1:
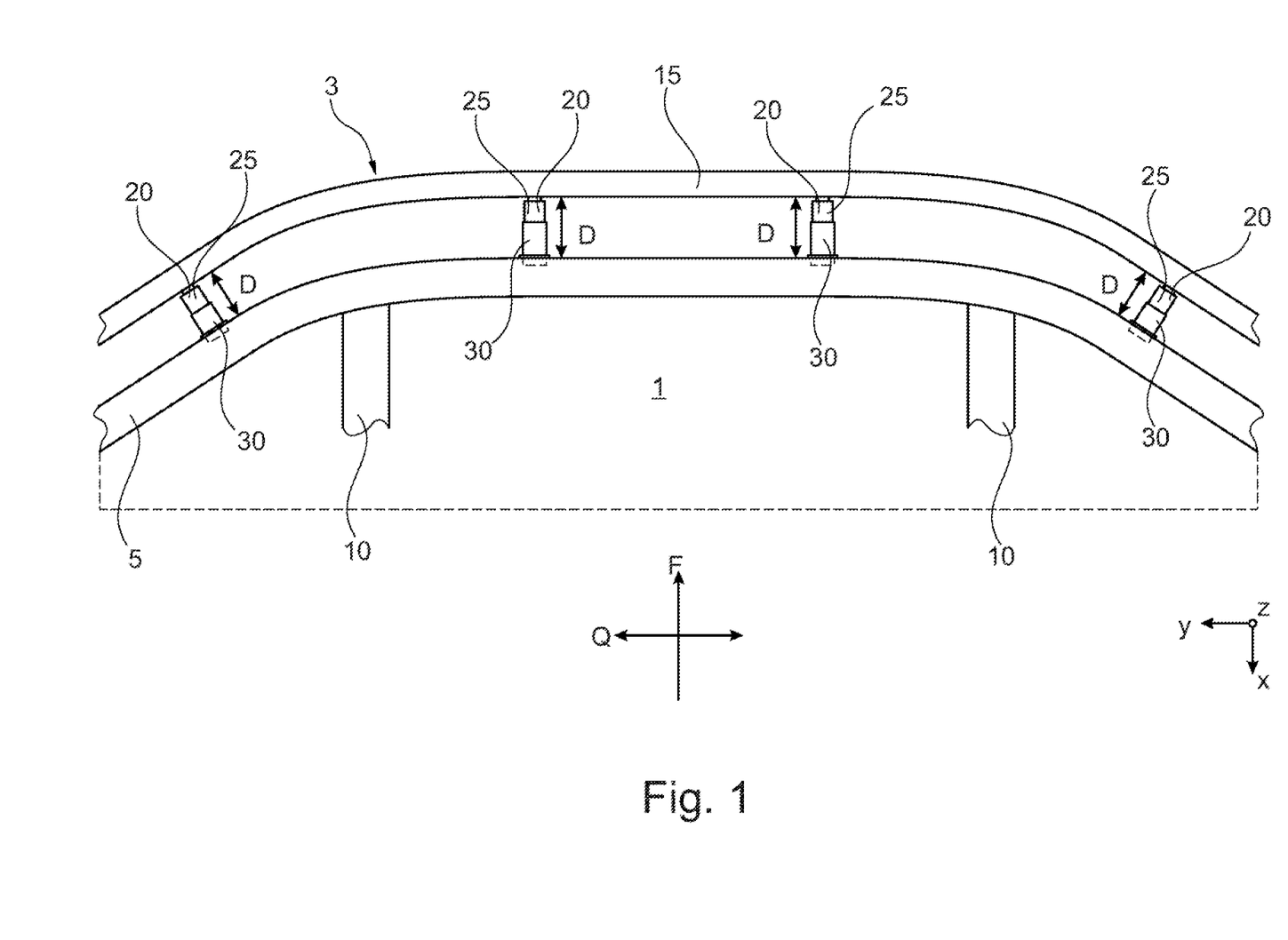
FIG. 1 is a partial view from above of a motor vehicle according to an embodiment of the invention with a number of assembled deformation elements in a normal position.

FIG. 1 is a schematic plan view of the front region of a motor vehicle 1 which is provided with an exemplary deformation device 3 according to the invention. A cross-member 5 is secured to the motor vehicle 1 by means of carriers 10. A bumper 15 is, in accordance with the normal position shown here (that is to say, in an accident-free situation), the element which protrudes furthest outward in the main travel direction F of the motor vehicle 1. Over the length of the cross-member 5 in the embodiment shown here four deformation elements 20 are distributed in the transverse direction Q. The respective characteristics of the deformation elements 20, in particular their respective spacings from each other, and the conditions under which the respective spacings D change between the cross-member 5 and bumper 15 are adjusted for each individual deformation element 20 in accordance with position and load, as explained below.

Figure 2:
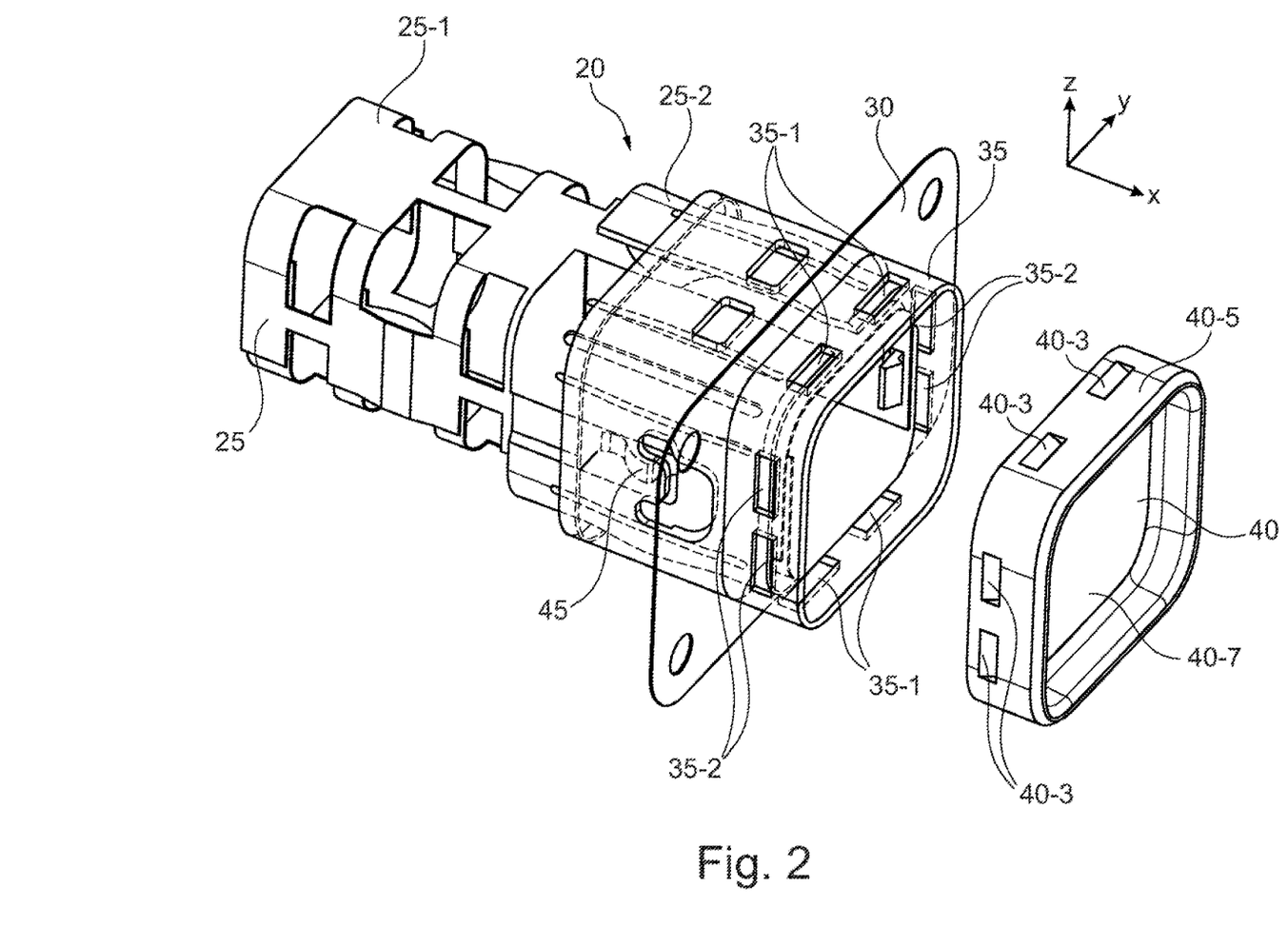
FIG. 2 is an exploded view of a portion of a deformation element illustrated in FIG. 1 as an enlarged perspective view.

FIG. 2 is a partial and enlarged exploded view of a single one of the deformation elements 20 illustrated in FIG. 1. The deformation element 20 comprises a first element 25 which itself is formed from a first portion 25-1 and a second portion 25-2 and a second element 30, wherein the first element 25 according to the embodiment shown here is connected at one end to the bumper 15 and at the other end is displaceably supported in the second element 30. The second element 30 is itself secured to the cross-member 5 using connection means not shown here, for example screws.

A restoring device 40 has a frame 40-5 which is provided with retention portions 40-3 which are distributed in a uniform manner at the outer side. The restoring device frame 40-5 is formed from a hard component. The frame 40-5 defines a surface 40-7 which is formed from a resilient soft component and against which the first element 25 moves into abutment in the event of an accident. In order to assemble the restoring device 40 which is constructed in this manner, it is simply necessary to place it over the outer side of the end portion 35 and to engage the retention portions 40-3 with receiving members 35-1 which are located on the second element 30.

In order to differentiate between the presence of a low-speed crash occurrence or a pedestrian protection situation, the deformation element 20 has a locking device 45 which is only partially illustrated in this instance. The locking device 45 is supported on the second element 30 such that it permits a relative movement between the first element 25 and the second element 30 in the event of a pedestrian protection situation. In the event of a low-speed crash, the locking device 45 enables a relative movement between the first element 25 and the second element 30 up to a specific limit value. If this limit value is exceeded, it locks the first element 25 with the second element 30, as described with reference to FIGS. 3A to 3C below.

Figure 3A:
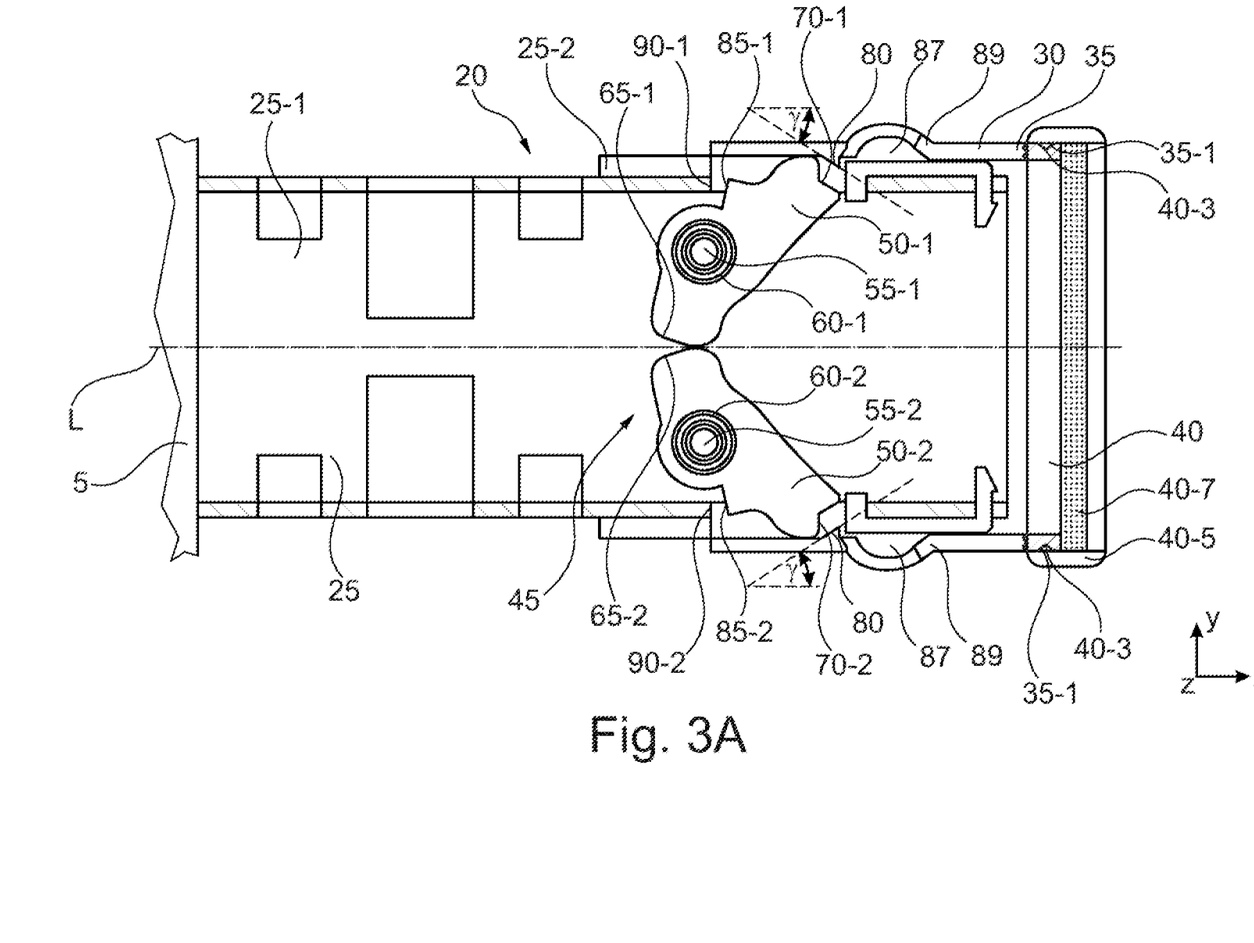
FIG. 3A is a sectioned side view of a portion of a deformation element which is located in an accident-free situation.

The deformation device 20 which is illustrated as a partially sectioned side view in FIG. 3A is in a normal position, that is to say, an accident-free situation is present for the motor vehicle 1.

The locking device 45 has a first centrifugal force lever 50-1 which is pivotably supported about a first pivot axis 55-1 which is located on the first element 25. A first torsion spring 60-1 which is actively connected to the first centrifugal force lever 50-1 is arranged around the first pivot axis 55-1. The first centrifugal force lever 50-1 additionally has a first rolling face 65-1 and a first abutment face 70-1 which is distal thereto.

In a similar manner, a second centrifugal force lever 50-2 which is adjacent to the first centrifugal force lever 50-1 is provided on the locking device 45 and is pivotably supported about a second pivot axis 55-2 which is located on the first element 30. A second torsion spring 60-2 which is actively connected to the second centrifugal force lever 50-2 is arranged around the second pivot axis 55-2. The second centrifugal force lever additionally has a second rolling face 65-2 and a distal second abutment face 70-2.

The first pivot axis 55-1 and the second pivot axis 55-2 are orientated parallel with each other. According to the embodiment shown here, the first rolling face 65-1 and the second rolling face 65-2 are in abutment with each other without pretensioning and support each other.

A portion 80 which is inclined in each case in the direction of the longitudinal axis L of the deformation device 20 is positioned in the second element 30. A corresponding angle of inclination γ which is selected according to this embodiment is 23° in a virtual plane defined by the first centrifugal force lever 50-1 and the second centrifugal force lever 50-2 and when viewed in the longitudinal direction L of the deformation device 3.

The inclined portion 80 of the second element 30 is adjoined by a recess 87, at the end of which, remote from the cross-member 5, a receiving face 89 is provided in each case.

Finally, the first centrifugal force lever 50-1 has a first locking face 85-1 and the second centrifugal force lever 50-2 has a second locking face 85-2 whose function in the same manner as the function on a counter-face 90-1 or second counter-face 90-2 located on the first element 25 will now be described.

In the accident-free situation shown in FIG. 3A, the ends of the first centrifugal force lever 50-1 or the second centrifugal force lever 50-2 remote from the first rolling face 65-1 or the second rolling face 65-2 are in abutment with an inner wall of the second element 30. The respective pretensioning of the first torsion spring 60-1 or second torsion spring 60-2 is sized in such a manner that a relative movement of the centrifugal force levers 50-1, 50-2 with respect to the respective inner walls, which movement brings about disruptive noise, is precisely prevented, but there is furthermore no relatively significant pressing pressure against the walls.

Figure 3B:
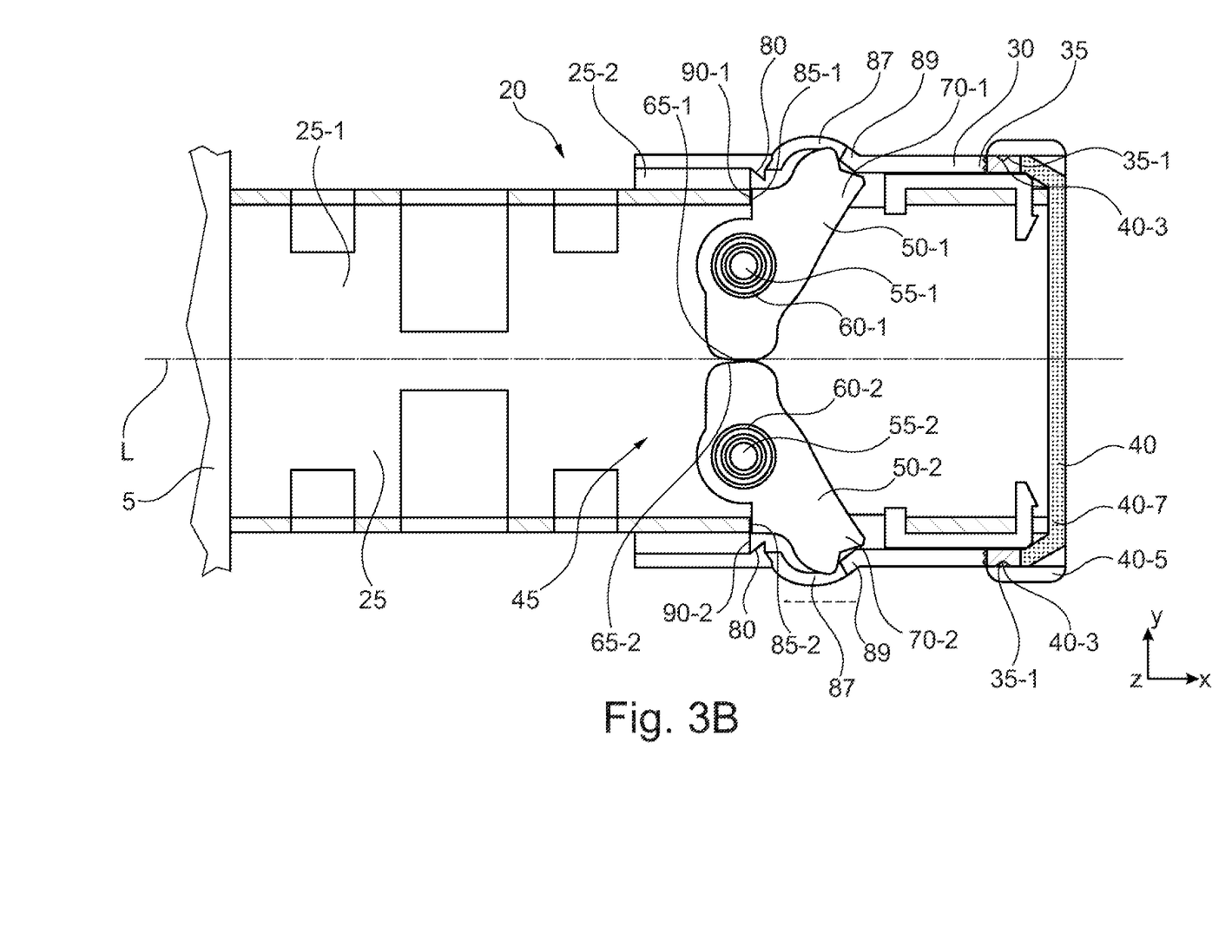
FIG. 3B shows the portion illustrated in FIG. 3A in a position assumed in the event of a low-speed crash.

In the event of a low-speed crash, the first element 25 moves in the x direction, wherein the two centrifugal force levers 50-1, 50-2, in their initial position shown in FIG. 3A, first pass the respective inclined portions 80. As a result of the portions 80 which are inclined in the direction of the longitudinal axis L, the first abutment face 70-1 and the second abutment face 70-2 are moved in the direction of the longitudinal axis and the two torsion springs 60-1, 60-2 are thus tensioned. As soon as the first abutment face 70-1 and the second abutment face 70-2 have overcome the respective inclined portions 80, in a state now tensioned by the two torsion springs 60-1, 60-2, they are moved into the respective recesses 87 of the second element 30 until they move into abutment with the receiving faces 89, as can be seen in FIG. 3B. In this manner and, on the one hand, as a result of rolling of the first rolling face 65-1 and the second rolling face 65-2 which takes place during this movement, and, on the other hand, as a result of an abutment of the first locking face 85-1 against the first counter-face 90-1 and an abutment of the second locking face 85-2 against the second counter-face 90-2, there is produced a reliable support of the two centrifugal force levers 50-1, 50-2 in such a manner that the path of the first element 25, and consequently of the cross-member 5, is limited.

During the low-speed-crash-induced movement of the first element 25 in the x direction, the restoring device 40 is pretensioned by the resilient surface means 40-7 with the exception of the portion thereof which is secured to the retention portions 40-3 also moving in the x direction. If the low-speed-crash-induced movement comes to an end, the surface means 40-7 moves back into the initial position thereof shown in FIG. 3A and, consequently, the first element 25 is moved back into the initial position thereof shown in the Figure mentioned.

Consequently, by means of the deformation element 20 shown here, a reversible movement of the first element 25 with respect to the second element 30 in the event of a low-speed crash or a restoring of the deformation element 20 into the initial position thereof can be brought about.

Figure 3C:
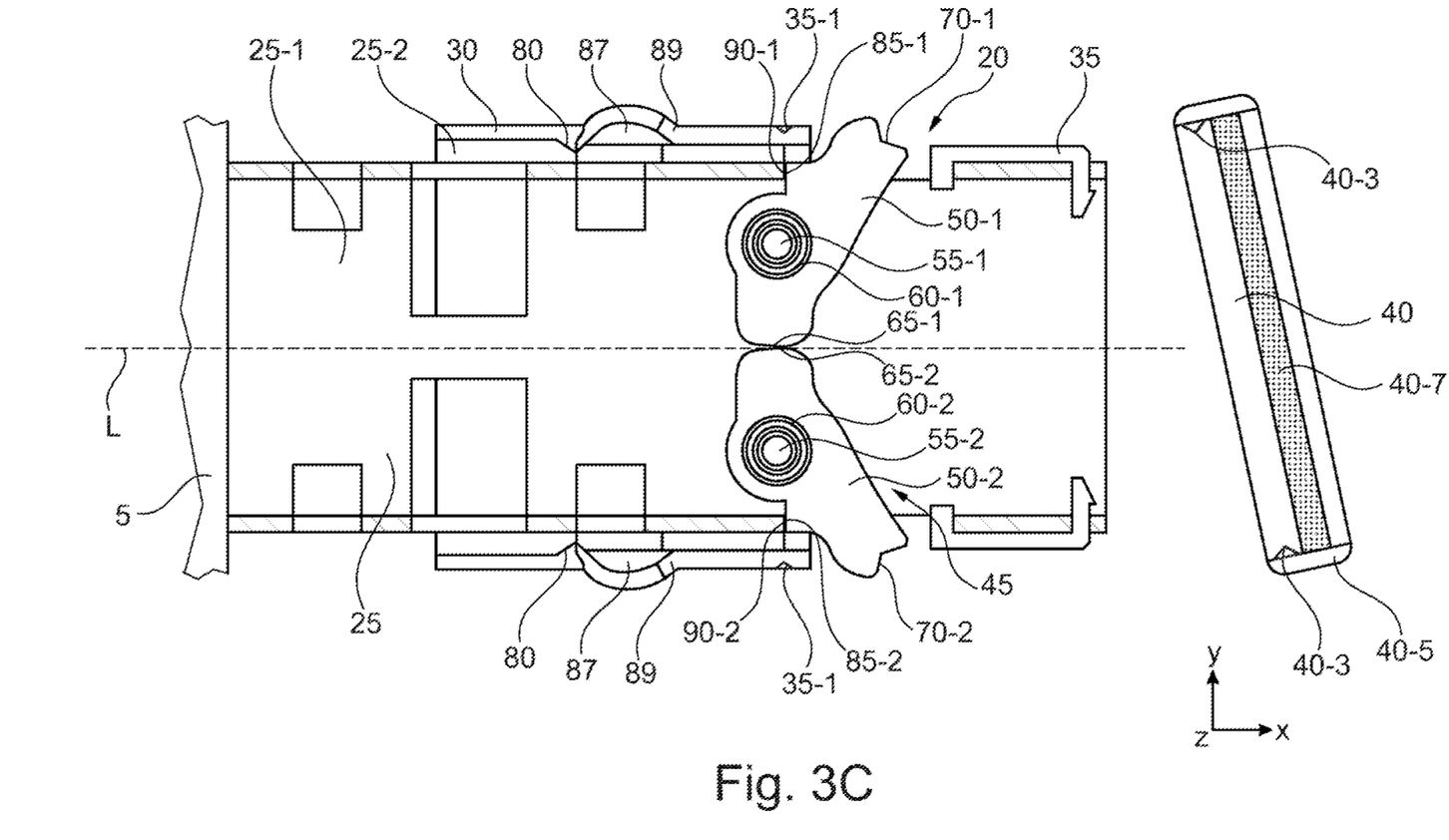
FIG. 3C shows the portion illustrated in FIGS. 3A and 3B in a position assumed in the case of a pedestrian protection function.

In the event of an accident situation which is shown in FIG. 3C and which represents a pedestrian accident, however, there is no support of the two centrifugal force levers 50-1, 50-2 on the respective receiving faces 89. Instead, the two centrifugal force levers 50-1, 50-2 move into the respective recesses as a result of inertia in such a manner that they overcome the end portion 35 and, only beyond this—in a state tensioned by the respective inclined portions 80—do they pivot outward under an action of the first rolling face 65-1 rolling with the second rolling face 65-2 until the first locking face 85-1 moves into abutment against the first counter-face 90-1 or the second locking face 85-2 moves into abutment against the second counter-face 90-2. The restoring device 40 is in this process separated from the second element 30 so that, in the event of the accident situation considered here, no reversible movement or restoring of the deformation element is provided.

LIST OF REFERENCE NUMERALS

1 Motor vehicle
3 Deformation device
5 Cross-member
10 Carrier
15 Bumper
20 Deformation element
25 First element
25-1 First portion
25-2 Second portion
30 Second element
35 End portion
35-1 Receiving member
40 Restoring device
40-1 Projection
40-3 Retention portions
40-5 Frame
40-7 Surface means
45 Locking device
50-1 First centrifugal force lever
50-2 Second centrifugal force lever
55-1 First pivot axis
55-2 Second pivot axis
60-1 First torsion spring
60-2 Second torsion spring
65-1 First rolling face
65-2 Second rolling face
70-1 First abutment face
70-2 Second abutment face
80 Inclined portion
85-1 First locking face
85-2 Second locking face
87 Recess
89 Receiving face
90-1 First counter-face
90-2 Second counter-face
D Spacing
F Main travel direction
L Longitudinal direction
Q Transverse vehicle direction
x, y, z Cartesian vehicle-orientated coordinate system according to ISO 4130-1978
γ Inclination angle

What is claimed is:

1. A deformation device for a motor vehicle having a cross-member, comprising a deformation element which is fittable to the cross-member, wherein the deformation element comprises:
a first element and a second element, which are displaceable relative to each other as a result of a collision; and
a locking device which is pretensionable and which is movably supported on the first element and which is optionally lockable or not lockable with the second element in the course of the collision, wherein
the locking device has a first centrifugal force lever which is pivotably supported about a first pivot axis located on the first element, and a second centrifugal force lever which is adjacent to the first centrifugal force lever and which is pivotably supported about a second pivot axis which is located on the first element,
the first centrifugal force lever has a first torsion spring which is arranged around the first pivot axis and which is actively connected to the first centrifugal force lever, a first rolling face and a first abutment face which is distal thereto, and
the second centrifugal force lever has a second torsion spring which is arranged around the second pivot axis and which is actively connected to the second centrifugal force lever, a second rolling face and a second abutment face which is distal thereto,
wherein, in an event of an accident situation which represents a low-speed collision, the first centrifugal force lever and the second centrifugal force lever pivot in each case about the first pivot axis or second pivot axis such that the first rolling face and the second rolling face move into abutment with each other, the first abutment face is in abutment with a corresponding first receiving face which is located on the second element, and the second abutment face is in abutment with a corresponding second receiving face which is located on the second element, and
wherein, in an event of an accident situation which represents a pedestrian collision, the first centrifugal force lever and the second centrifugal force lever pivot in each case about the first pivot axis and the second pivot axis such that the first rolling face and the second rolling face are in abutment with each other, while the first abutment face and the second abutment face are remote from the second element.

2. The deformation device according to claim 1, wherein the second element has a portion which is inclined in the direction of the first element and via which the distal end of the first centrifugal force lever with respect to the first rolling face and via which the distal end of the second centrifugal force lever with respect to the second rolling face slides in the course of the collision in order to tension the first torsion spring or second torsion spring.

3. The deformation device according to claim 2, wherein the inclined portion has, in a virtual plane defined by the first centrifugal force lever and the second centrifugal force lever and when viewed in the longitudinal direction of the deformation device, an inclination angle between 5° and 30°.

4. The deformation device according to claim 2, wherein the inclined portion has, in a virtual plane defined by the first centrifugal force lever and the second centrifugal force lever and when viewed in the longitudinal direction of the deformation device, an inclination angle between 20° and 25°.

5. The deformation device according to claim 2, wherein the inclined portion has, in a virtual plane defined by the first centrifugal force lever and the second centrifugal force lever and when viewed in the longitudinal direction of the deformation device, an inclination angle of 23°.

6. The deformation device according to claim 1, wherein the first centrifugal force lever has a first locking face which in the course of the collision is in abutment with a corresponding first counter-face which is located on the first element, and
the second centrifugal force lever has a second locking face which in the course of the collision is in abutment with a corresponding second counter-face which is located on the first element.

7. A motor vehicle, comprising:
a cross-member;

a bumper; and at least one deformation device according to claim 6.

8. The deformation device according to claim 1, further comprising:
- a restoring device which is constructed in a resilient manner and which is supported on the second element for returning the first element into a collision-free starting position.

9. The motor vehicle according to claim 8, wherein
- a plurality of deformation devices whose respective restoring devices have spring characteristics which are at least partially different from each other are arranged in a transverse vehicle direction.

10. A motor vehicle, comprising:

a cross-member;

a bumper; and at least one deformation device according to claim 1.

* * * * *